US008538807B2

(12) United States Patent
Dishneau et al.

(10) Patent No.: US 8,538,807 B2
(45) Date of Patent: Sep. 17, 2013

(54) PREDICTIVE SHOPPING NOTIFICATIONS

(75) Inventors: Darin J. Dishneau, Snoqualmie, WA (US); Patrick Joseph Derks, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/276,227

(22) Filed: Oct. 18, 2011

(65) Prior Publication Data
US 2013/0097002 A1    Apr. 18, 2013

(51) Int. Cl.
*G06Q 30/00* (2012.01)
(52) U.S. Cl.
USPC ............... 705/14.25; 705/14.23; 705/14.35
(58) Field of Classification Search
USPC ............................................ 705/14.25
See application file for complete search history.

(56) References Cited

U.S. PATENT DOCUMENTS

| | | | |
|---|---|---|---|
| 5,983,200 A * | 11/1999 | Slotznick | 705/26.43 |
| 6,177,905 B1 | 1/2001 | Welch | |
| 6,823,188 B1 | 11/2004 | Stern | |
| 7,068,189 B2 | 6/2006 | Brescia | |
| 7,394,405 B2 | 7/2008 | Godden | |
| 7,653,594 B2 | 1/2010 | Davis | |
| 7,940,172 B2 | 5/2011 | Bell et al. | |
| 2001/0037259 A1 | 11/2001 | Sharma et al. | |
| 2003/0191578 A1 | 10/2003 | Paulauskas et al. | |
| 2004/0093274 A1 | 5/2004 | Vanska et al. | |
| 2004/0230685 A1 | 11/2004 | Seligmann | |
| 2005/0273493 A1 | 12/2005 | Buford et al. | |
| 2006/0273930 A1 | 12/2006 | Godden | |
| 2006/0288347 A1 | 12/2006 | Jemiolo et al. | |
| 2007/0143499 A1 | 6/2007 | Chang | |
| 2007/0188319 A1 | 8/2007 | Upton | |
| 2008/0032703 A1 | 2/2008 | Krumm et al. | |
| 2008/0082396 A1 | 4/2008 | O'Connor et al. | |
| 2008/0154727 A1 * | 6/2008 | Carlson | 705/14 |
| 2008/0195312 A1 | 8/2008 | Aaron et al. | |
| 2008/0214166 A1 | 9/2008 | Ramer et al. | |
| 2009/0259547 A1 * | 10/2009 | Clopp | 705/14.16 |
| 2010/0093371 A1 | 4/2010 | Gehrke et al. | |
| 2010/0280880 A1 | 11/2010 | Faith et al. | |
| 2011/0010737 A1 | 1/2011 | Bouazizi et al. | |
| 2011/0045801 A1 | 2/2011 | Parker | |
| 2011/0060636 A1 | 3/2011 | Grossman et al. | |

(Continued)

OTHER PUBLICATIONS

"Shopping by phone takes off", Web Japan, Japan Echo Inc., Tokyo, Jul. 25, 2006, found on line at web-japan.org/trends/lifestyle/lif060725.html.*

(Continued)

*Primary Examiner* — John G Weiss
*Assistant Examiner* — Scott C Anderson
(74) *Attorney, Agent, or Firm* — Wolfe-SBMC

(57) ABSTRACT

This document describes techniques and apparatuses that enable predictive shopping notifications. In some embodiments, the techniques determine a purchase pattern for a product based on a user's purchase history, provide this purchase pattern to potential sellers, receive discount offers for the product from those sellers, and notify the user of these offers through his or her mobile device. By so doing, the techniques enables users to pay less for a product that the techniques predict that the user will want to purchase. Also, in some embodiments, the techniques remind a user to purchase a product based on this purchase pattern, such as through a notification indicating that the user is likely running out of that product.

20 Claims, 8 Drawing Sheets

(56) References Cited

U.S. PATENT DOCUMENTS

| | | |
|---|---|---|
| 2011/0093324 A1 | 4/2011 | Fordyce, III et al. |
| 2011/0112992 A1 | 5/2011 | Liu et al. |
| 2011/0144908 A1 | 6/2011 | Cheong |
| 2011/0164861 A1 | 7/2011 | Kunkel et al. |
| 2012/0289254 A1 | 11/2012 | Dishneau |

OTHER PUBLICATIONS

Sohn, Timothy et al., "Place-Its: A Study of Location-Based Reminders on Mobile Phones", *In Proceedings of UbiComp 2005*, Available at <http://www.kevinli.net/placeits-ubicomp05.pdf>,(2005), pp. 232-250.

"GeoQpons Introduces Time-Based Alerts for Mobile Shopping and Savings", *Live-PR Public Relations & News*, retrieved from <http://www.live-pr.com/en/geoqpons-introduces-time-based-alerts-for-r1048824624.htm>,(Jan. 4, 2011), 2 pages.

"Placecast and Location Labs Team up for Location-Based Shopping Alerts", VentureBeat.com, retrieved from <http://venturebeat.com/2010/08/18/placecast-and-location-labs-team-up-to-deliver-location-based-shopping-alerts-via-text-message/> on May 11, 2011,(Aug. 18, 2010), 6 pages.

"Final Office Action", U.S. Appl. No. 13/105,754, (Feb. 16, 2012),14 pages.

Acquisti, et al., "Conditioning Prices on Purchase History", Retrieved at <<http://citeseerx.ist.psu.edu/viewdoc/download-?doi=10.1.1.58.3641&rep=rep1&type=pdf>>, Marketing Science, vol. 24, No. 3, Aug. 2001, pp. 1-36.

"Non-Final Office Action", U.S. Appl. No. 13/105,754, (Apr. 24, 2013), 17 pages.

* cited by examiner

PREDICTIVE SHOPPING NOTIFICATIONS

BACKGROUND

Consumers repeatedly purchase the same products, often at same or similar times of the week or month. A consumer may purchase her produce and dairy products on Mondays from an organic market, for example, and dry goods on Wednesdays, like paper towels and detergent, from a typical grocery store.

Currently, many consumers, if they wish to purchase these items more cheaply or conveniently, scour newspapers for coupons or visit other stores only to find that the products are not available or are more expensive. Further, in many cases consumers are open to similar products that may be superior or less expensive, but are not readily aware of these similar products.

SUMMARY

This document describes techniques and apparatuses that enable predictive shopping notifications. In some embodiments, the techniques determine a purchase pattern for a product based on a user's purchase history, provide this purchase pattern to potential sellers, receive discount offers for the product from those sellers, and notify the user of these offers through his or her mobile device. By so doing, the techniques enables users to pay less for a product that the techniques predict that the user will want to purchase. Also, in some embodiments, the techniques remind a user to purchase a product based on this purchase pattern, such as through a notification indicating that the user is likely running out of that product.

This summary is provided to introduce simplified concepts for predictive shopping notifications, which are further described below in the Detailed Description. This summary is not intended to identify essential features of the claimed subject matter, nor is it intended for use in determining the scope of the claimed subject matter.

BRIEF DESCRIPTION OF THE DRAWINGS

Embodiments of techniques and apparatuses for predictive shopping notifications are described with reference to the following drawings. The same numbers are used throughout the drawings to reference like features and components.

DETAILED DESCRIPTION

Overview

This document describes predictive shopping notifications. By notifying a user of a mobile device about a product predicted to be of interest to the user and based on the user's own purchase history, the techniques enable the user to save time, save money, or add convenience to the user's shopping tasks.

Consider, for example, a case where a user of a mobile device purchases dog food about every five or six weeks. Assume that he purchases the same kind of dog food from the same grocery store. Assume also that he doesn't think to buy the dog food until all of it is gone and then has to make a special trip, rather than his regular weekly trip to that same grocery store. In this case, the techniques may remind the user on the day of his normal trip to the grocery store and between four and five weeks since the last time he purchased dog food. By so doing, the techniques may save him a special trip to that grocery store. Further, the techniques may actively seek out coupons or other special offers for him, either at that store or another, nearby store that also offers that or a similar dog food.

This is but one example of how techniques for predictive shopping notifications can predict a product of interest to a user of a mobile device and remind the user and/or notify the user of a discount for the product. Techniques and/or apparatuses enabling predictive shopping notifications are referred to herein separately or in conjunction as the "techniques" as permitted by the context. This document now turns to an example environment in which the techniques can be embodied, after which various example methods for performing the techniques are described.

EXAMPLE ENVIRONMENT

Figure 1:
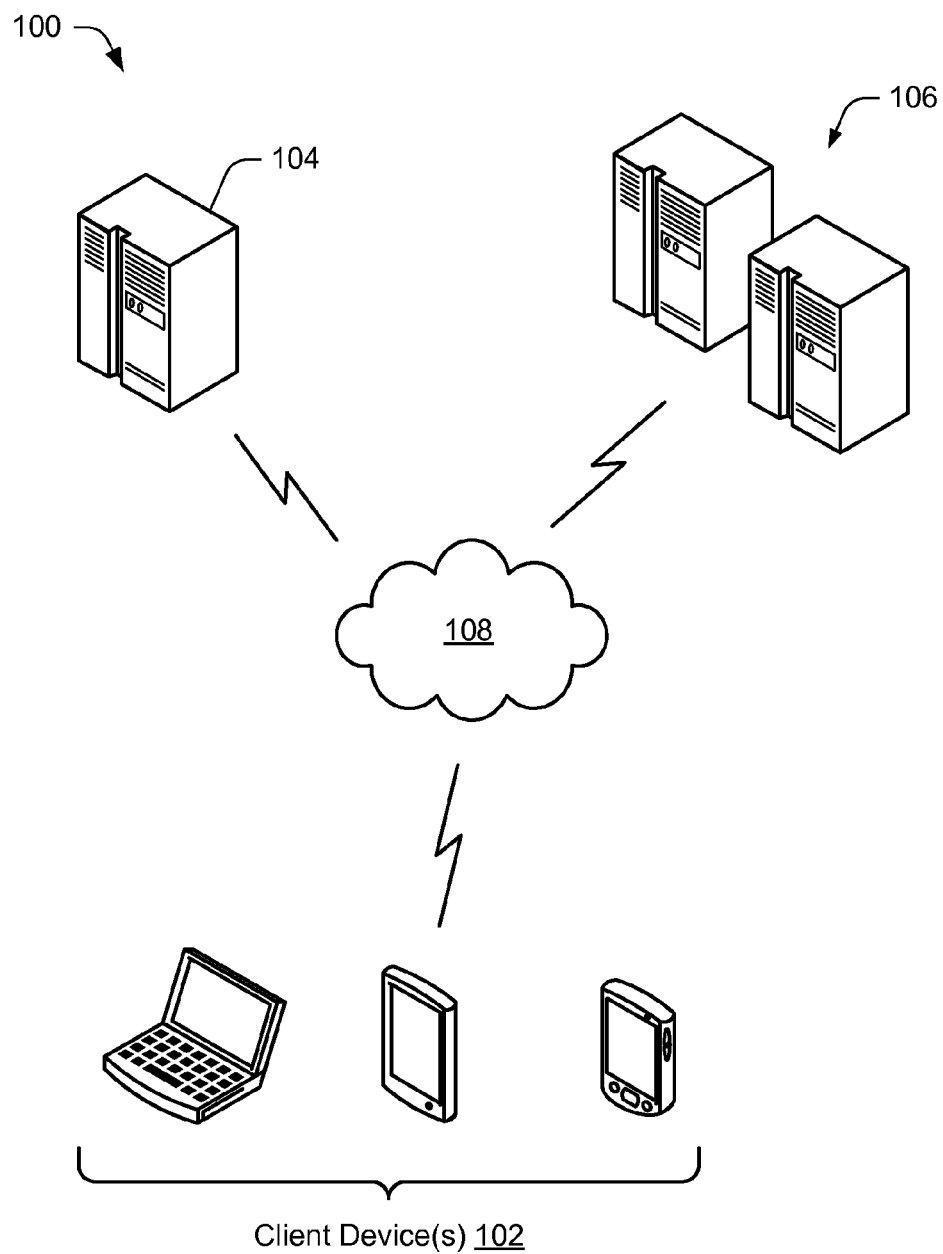
FIG. 1 illustrates an example environment in which techniques for predictive shopping notifications can be implemented.

FIG. 1 is an illustration of an example environment 100 in which the techniques may provide predictive shopping notifications. Environment 100 includes a mobile computing device 102, a remote device 104, third-party devices 106, and a communication network 108. Mobile computing device 102 provides notifications to a user and may determine products likely to be of interest to the user based on the user's purchase history, either alone or in conjunction with remote device 104. Mobile computing device 102, remote device 104, and third-party devices 106 interact through communication network 108, which may be the Internet, a local-area network, a wide-area network, a wireless network, a USB hub, a computer bus, another mobile communications network, or a combination of these.

Figure 2:
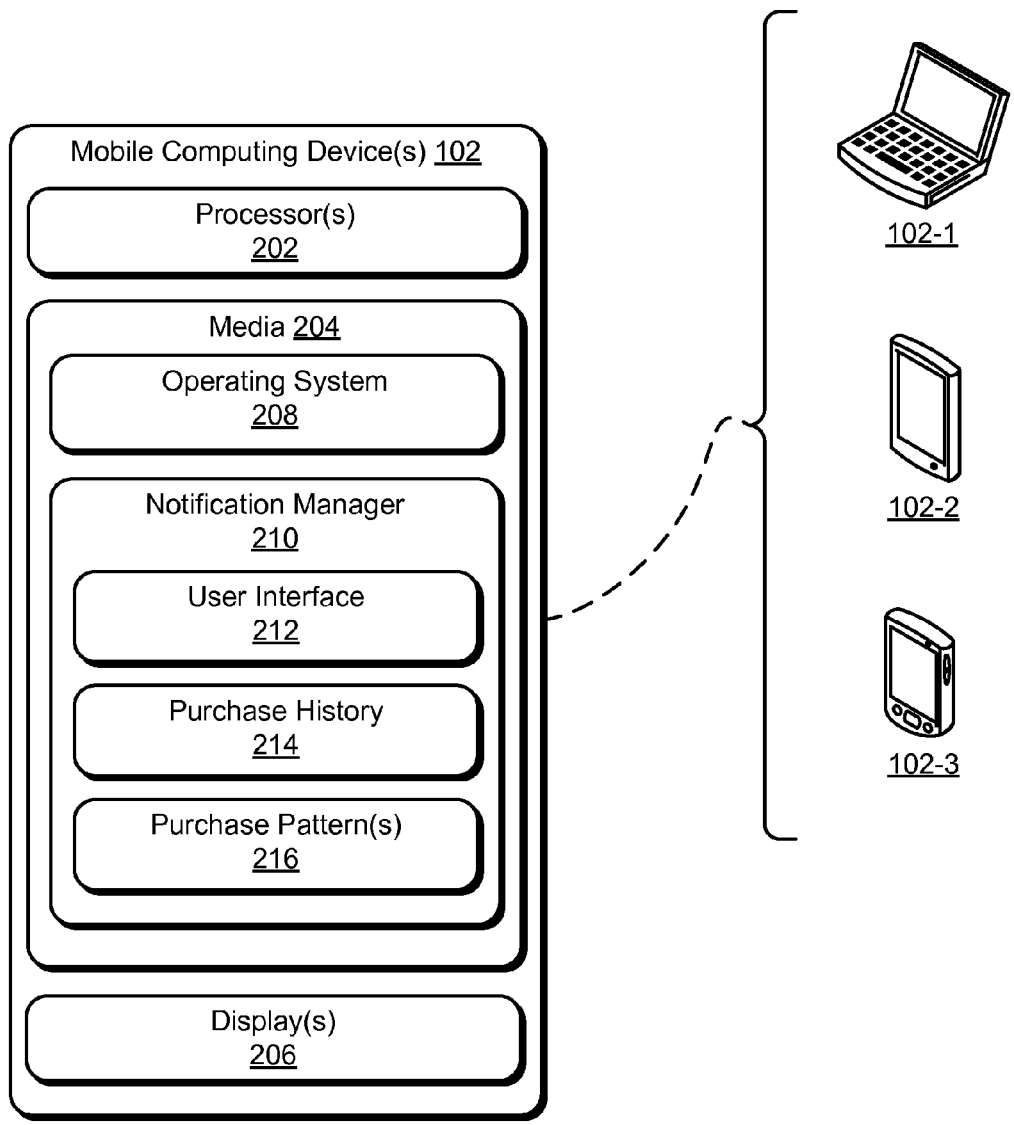
FIG. 2 is a more-detailed illustration of mobile computing devices illustrated in FIG. 1.

FIG. 2 is an illustration of an example embodiment of mobile computing device 102. Mobile computing device 102 includes one or more processors 202, computer-readable storage media ("media") 204, and display(s) 206. Media 204 includes an operating system 208 and notification manager 210. Notification manager 210 includes or has access to one or more of a user interface 212 and a purchase history 214. Notification manager 210 uses purchase history 214 to determine purchase patterns 216 for various products.

Notification manager 210 manages predictive shopping notifications either alone or in combination with other entities described herein. User interface 212, shown included in notification manager 210, notifies a user, such as with an audio or visual indicator, email, text message, or visual display.

Purchase history 214 may include purchase information from numerous sources, such as a user's bank, credit/debit card companies or credit/debit merchant processors, online "shopping carts," merchants themselves (e.g., online or brick-and-mortar stores, whether directly, in conglomerate, or aggregated by a third party), whether purchased through mobile device 102 or otherwise. Some or even all purchases aggregated into purchase history 214 may be made through mobile device 102. Thus, mobile device 102 may be the direct entity making the purchase, such as through entry of a credit card number into mobile device 102 as part of an online purchase, or through mobile device 102 at a brick-and-mortar store. Mobile device 102 can be used to make such purchases, in some cases, through credit/debit or other accounts for online or brick-and-mortar stores, near-field communications ("NFCs"), and/or scanning technology (e.g., barcode or matrix codes), to name just a few.

Purchase history 214 can be a collection of purchases, including each product purchased, when and at what price each product is purchased, from what store, and what other products are purchased at a same time (e.g., from the same store on the same day). This collection in the purchase history 214 can be aggregated and organized, though this is not required. In some cases purchase history 214 includes a table for each product indicating this information for easy use and analysis.

Mobile computing device(s) 102 can each be one or a combination of various computing devices as illustrated in FIG. 2, here with three examples: a laptop computer 102-1, a tablet computer 102-2, and a smart phone 102-3, though other computing devices and systems, such as netbooks and cellular phones, may also be used.

Figure 3:
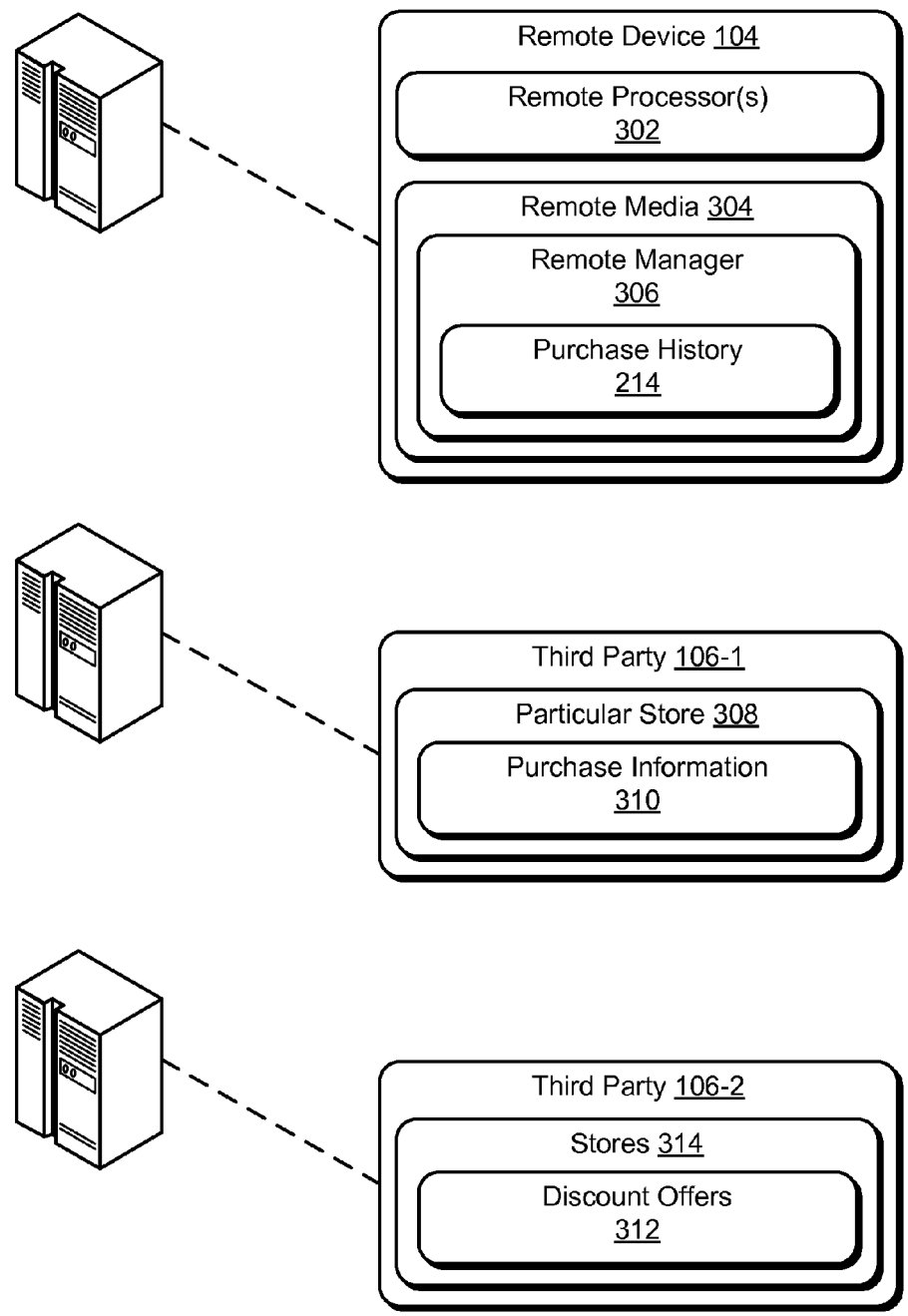
FIG. 3 is a more-detailed illustration of the remote device and third-party devices of FIG. 1.

FIG. 3 is an illustration of an example embodiment of remote device 104 and two third-party devices 106. Remote device 104 includes one or more remote processors 302 and remote computer-readable storage media ("remote media") 304. Remote media 304 includes remote manager 306, which may include or have access to purchase information and/or purchase history 214 or parts thereof.

Third-party devices 106 may include purchase information useful in building purchase history 214 and/or discount offers 216. Each of third-party devices 106 may be associated with one store, one conglomerate of stores, or one corporate entity associated with stores (whether similar or different). Third-party devices 106 may also or instead be an aggregator of purchase information or of discount offers, such as a coupon provider providing coupons for disparate stores. In FIG. 3, third-party devices 106 are shown with two example devices 106-1 and 106-2, with third-party device 106-1 shown associated with a particular store 308 and its purchase information 310 and third-party device 106-2 shown associated with discount offers 312 from many stores 314. As noted in part above, third-party devices 106 are capable of providing purchase information and/or discount offers to mobile device 102.

These and other capabilities, as well as ways in which entities of FIGS. 1-3 act and interact, are set forth in greater detail below. Note also that these entities may be further divided, combined, and so on. Thus, the environment 100 of FIG. 1 and the detailed illustrations of FIGS. 2 and 3 illustrate some of many possible environments capable of employing the described techniques.

EXAMPLE METHODS

Figure 4:
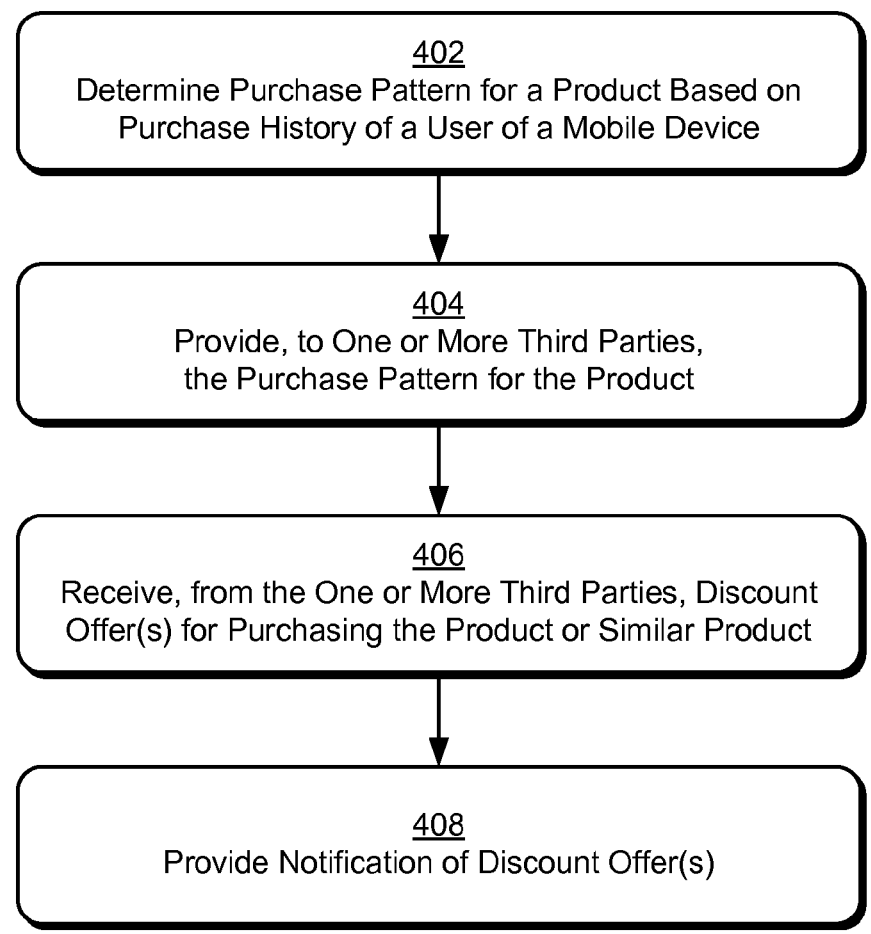
FIG. 4 illustrates an example method for predictive shopping notifications for which a discount offer is available.
Figure 6:
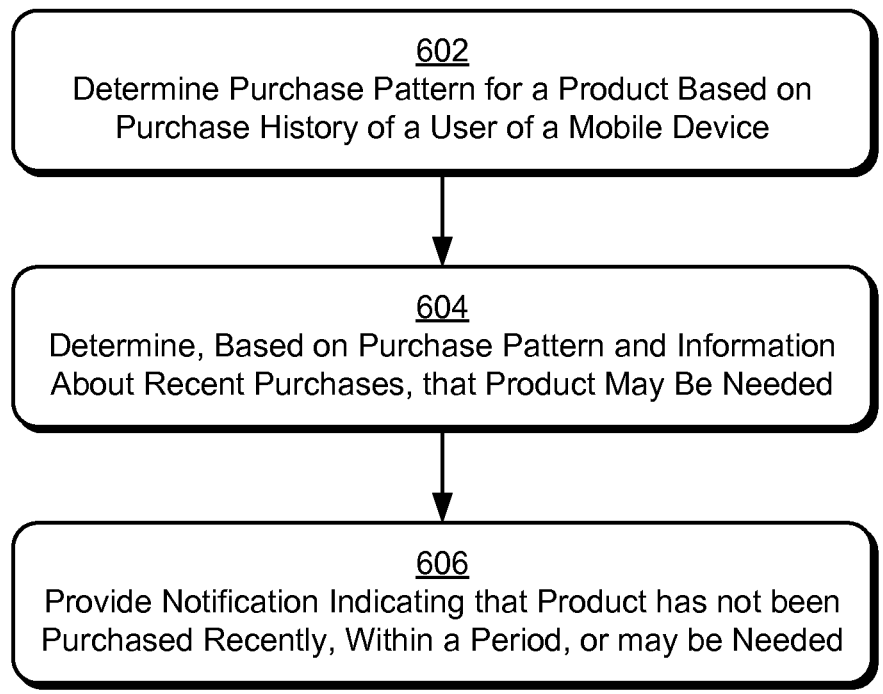
FIG. 6 illustrates an example method for predictive shopping notifications indicating that a product may soon need to be purchased.

FIGS. 4 and 6 illustrate example methods for predictive shopping notifications. FIG. 4 illustrates an example method for predictive shopping notifications for which a discount offer is available. FIG. 6 illustrates an example method for predictive shopping notifications indicating that a product may soon need to be purchased. These methods are shown as sets of blocks that specify operations performed but are not necessarily limited to the order shown for performing the operations by the respective blocks. In portions of the following discussion reference may be made to environment 100 of FIG. 1 and as detailed in FIGS. 2-3, reference to which is made for example only. The techniques are not limited to these example methods nor performance by one entity or multiple entities operating on one or multiple devices. Furthermore, these methods may be used alone or in combination with each other, in whole or in part.

Block 402 determines a purchase pattern for a product based on a purchase history of a user of a mobile device. As noted in part above, this purchase history can be of various types and include none or many purchases made through the mobile device. The techniques may also build the purchase history from various sources and types of purchase information, also noted above. The purchase pattern may indicate one or numerous products, as well as times at which each product was purchased, locations or stores at which the products were purchased, and prices at which the products were purchased.

Consider, by way of example, a case where a user named "Lydia" repeatedly uses her smart phone 102-3 to purchase milk and various fruits and vegetables at a local grocery store, most often on Mondays between 7 pm and 9 pm. Notification manager 210, operating on her smart phone 102-3, records these purchases and stores them in purchase history 214 (either remotely on remote media 304 or on media 204).

At block 402, notification manager 210 determines purchase patterns for products recorded in purchase history 214. Here assume that notification manager 210 determines that Lydia purchases a particular brand of milk, "Green Pastures 1%," often two half-gallons of each, almost every Monday between 7 pm and 9 pm, and at "Wholesome Foods Grocery Store." Based on these determinations, notification manager 210 builds a purchase pattern for Green Pastures 1% that includes this information.

Block 404 provides, to one or more third parties associated with stores at which the product or a similar product may be purchased, the purchase pattern for the product. Block 404 may provide purchase patterns for many products, separately or in conglomerate. In the ongoing example, notification manager 210 provides purchase pattern 216 for Green Pastures 1% milk. This purchase pattern 216 can be represented in a table, such as example Table I below.

TABLE I

| Type | Sub-Type | Name | Cost | No. | Store | Time/Date | Period |
|------|----------|------|------|-----|-------|-----------|--------|
| Dairy | Milk | Green Pastures 1%, ½ Gallon | $2.99 | 2 | Wholesome #34 | Monday 7 pm-9 pm | 7 Days |

This example purchase pattern 216 of Table I includes the name of the product, its type and sub-type, cost per item, number of items at each purchase (here a median, though a mean or range may instead be used), a store identity (a particular Wholesome Foods Grocery Store rather than just the name), a time and date at which the product is typically purchased (here a range within a standard deviation), and a period (weekly).

In this example assume notification manager 210 provides this purchase pattern 216 to a third party associated with Wholesome Foods Grocery Store, another third party, here associated with a competitor of Wholesome Foods Grocery Store, named Warehouse Foods, and a discount aggregating third party, named Value Center, which provides electronic or paper coupons for many different stores.

Block 406 receives, from one or more of the third parties, a discount offer for purchasing the product or a similar product. As noted in part above, this discount offer can be for the same product at a lower cost than at least one of the prices at which the product was purchased. This discount offer may be offered through the same store at which the product was purchased or at a new store not indicated in the purchase history as one at which the product was purchased. If at a different store, the store may be online versus a local store at which the product was purchased, or vice-a-versa. If a local store when the product is purchased at another local store, the different local store may be at a location similar to at least one of the stores at which the product was purchased as noted in the purchase pattern.

In some cases the discount offer may be for a similar product. In such a case, it may indicate information about the similar product, such as why it is better, similar, or less expensive.

Continuing the ongoing example, assume that notification manager 210 receives, in response to sending purchase pattern 216 for the Green Pastures milk, three discount offers. One from the third party associated with Wholesome #34, one from the third-party competitor, Warehouse Foods, and one from the third-party aggregator, Value Center, for another, local store.

Assume that the first discount offer is for a similar product for sale at the same store, Wholesome #34, in this case for Organic Farms 1% in half gallons and at a sale price this week of $3.15 instead of the usual price of $3.49. Assume also that the discount offer includes information indicating that Organic Farms 1%, while slightly more expensive that the Green Pastures 1%, is organic (and thus worth the extra cost).

Assume that the second discount offer is for the same product but at Warehouse Foods. The second discount offer does not indicate a sale or coupon, but instead that the same product can be purchased at lower cost, namely $2.19 per half gallon. This second discount offer also indicates the store's address for the consumer's convenience.

Assume that the third discount offer is for the same product at a different store, namely Quick-Market, and includes an electronic coupon for $1.00 off the normal price of $2.99 per half gallon of Green Pastures 1%.

Block 408 provides a notification, through the mobile device, of at least one of the discount offers. As noted in part above, block 408 may provide this notification in various manners, such as through a text, email, or visual interface, to name just three.

If block 406 receives more than one discount offer, such as in the example case, block 408 may simply provide all of the discount offers, or instead, may determine which offer is superior, e.g., by determining which of two discount offers offer a lowest total cost for a product. Block 408 may provide a notification of only the offer having the lowest total cost or both offers but indicate the lowest total cost or difference in cost between the discount offers.

Figure 5:
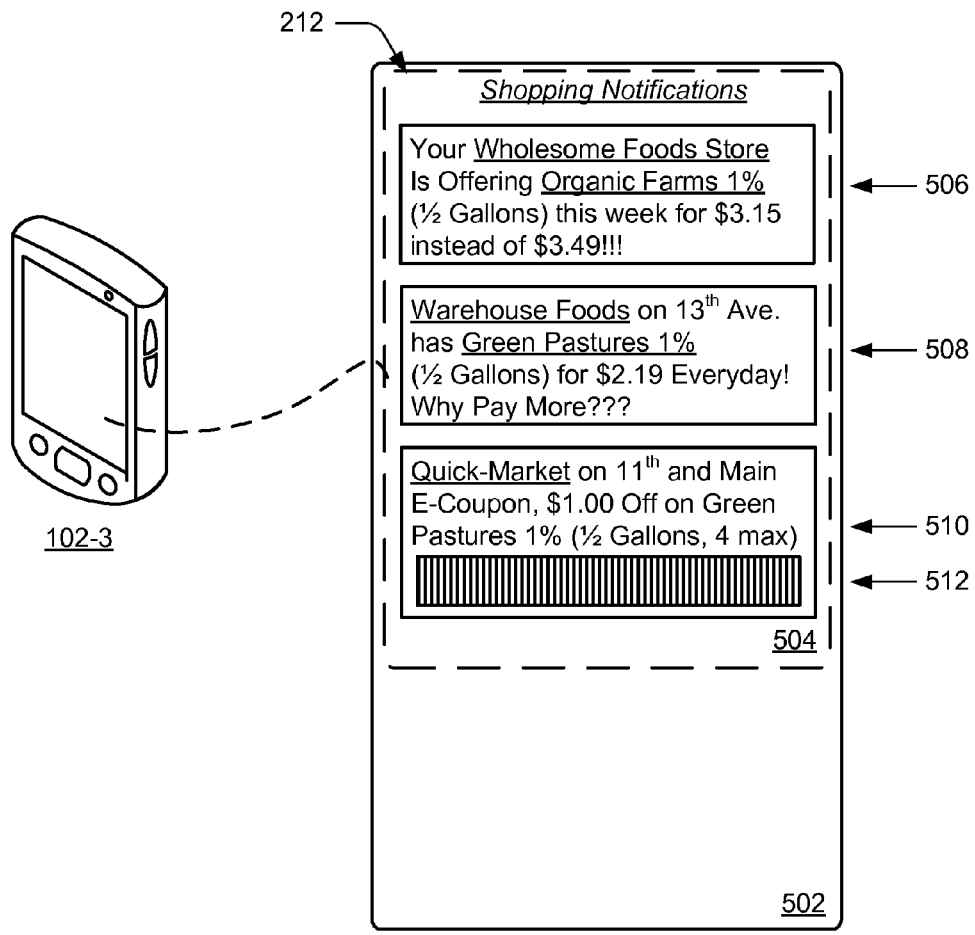
FIG. 5 illustrates three predictive shopping notifications, through the user interface of FIG. 2, indicating products predicted to be of interest to a user of the mobile device and for which a discount offer is available.

Concluding the ongoing example, notification manager 210 receives the above-noted three discount offers, and then displays these discount offers through user interface 212 on Lydia's smartphone 102-3. This is illustrated in FIG. 5, which shows smartphone 102-3 having a display 502 and a notification area 504 of user interface 212. Discount offer 506 illustrates the first discount offer for a similar product for sale at the same store. Discount offer 508 illustrates the second discount offer for the same product but at Warehouse Foods. Discount offer 510 illustrates the third discount offer for the same product at a different store and includes an electronic coupon 512 readable at the store for the applicable discount.

Discount offers may be tailored to the appropriate time, either indicating the time at which they should be presented, or notification manager 210 may instead determine when best to notify the consumer. In either case, discount offers may include an expiration date, in which case notification manager 210 displays the discount offers prior to expiration. Discount offers may also include a notification date and time, in which case notification manager 210 notifies the user at the notification date and time.

Notification manager 210, for example, may display discount offers 506, 508, and 510 on the day of the week—Monday—that Lydia typically shops for milk and at the time of the day—7 pm.

FIG. 6 illustrates an example method 600 for predictive shopping notifications, the notifications indicating that a product may soon need to be purchased, reminding a consumer of a product, or notifying the user of a product likely to be of interest to the user. The techniques may perform aspects of both methods 400 and 600, such as by indicating that a product may soon need to be purchased and also providing a discount offer for that or a similar product.

Block 602 determines, based on a purchase history of a user of a mobile device, a purchase pattern for a product. Block 602 may operate similarly to block 402 of method 400, though the purchase pattern can be determined other than to facilitate discount offers.

Block 604 determines, based on the purchase pattern for the product and information about recent purchases made, that the product may be needed by the user, such as because the product has not been purchased within a regular period indicated in the purchase pattern.

The purchase pattern may be determined based solely on purchases of the product made through the mobile device, though this is not required. Further, the information about recent purchases may be solely those made through the mobile device, though this also is not required. This information may be determined from the purchase history or retained or determine separately, such as in a case where a user has purchased a particular product once a month from seven months ago to two months ago. The fact that the particular product was not purchased last month based on it not being recorded in the purchase history can indicate that the product has not been purchased at its normal frequency.

Consider, for example, a case where a user of table computer 102-2 named "John" regularly purchases, about once-a-month, movie tickets from either an online source or a local theater. Notification manager 210 can build the purchase history based on this information, such as by retrieving purchase information from local memory or remote device 104 and/or third parties 106 of FIG. 1.

At block 604, notification manager 210 determines a purchase pattern 216 for the product (movie tickets) based on information in purchase history 214, including titles of movies purchased, dates purchased, dates that the movies were watched, prices paid, theaters purchased from or watched at, and from which online sources (if any) movie tickets were purchased. This purchase pattern 216 includes a regular period for purchasing the movie tickets, namely about once-a-month, theaters visited (here assumed to be two local theaters), and prices paid.

Block 606 provides a notification, through the mobile device, indicating that the product has not been purchased recently, has not been purchased within the regular period, or needs to be purchased. This notification may be presented in any of the various manners set forth above.

Concluding the ongoing example, notification manager 210 provides a notification indicating that movie tickets may be needed or desired when it has been about a month since John last purchased movie tickets. Furthermore, notification manager 210 may also provide this product's purchase pattern 216 to third parties, receive discount offers, and provides one or more of those offers with the notification.

Figure 7:
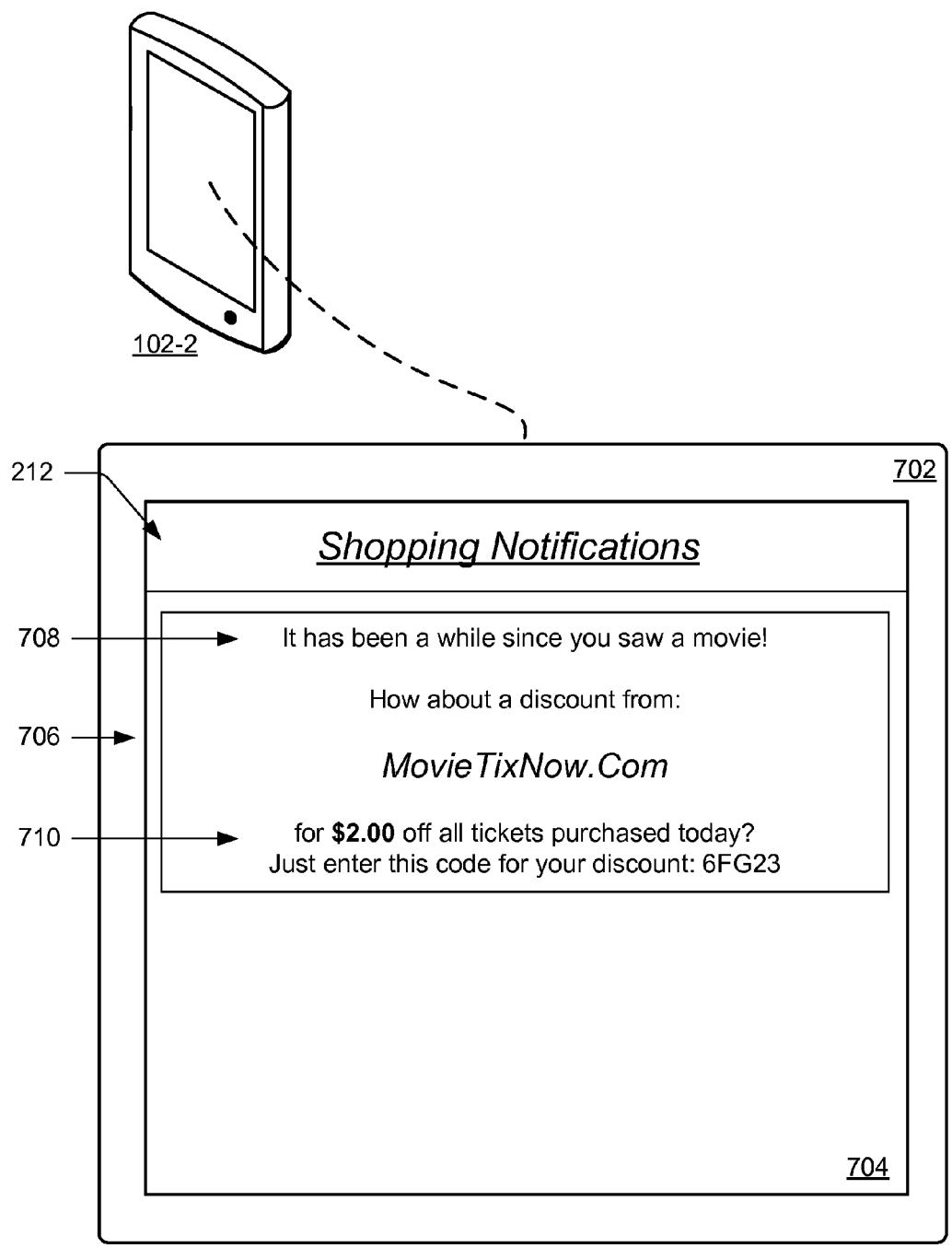
FIG. 7 illustrates a predictive shopping notification, through the user interface of FIG. 2, for a product that may soon need to be purchased or otherwise is likely of interest to a user.

FIG. 7 illustrates such a notification displayed through user interface 212 on John's tablet computer 102-2, which has a display 702 and a notification area 704 of user interface 212. Notification 706 includes a reminder 708 indicating that John may wish to purchase movie tickets as well a discount offer 710 offering a $2.00 discount on tickets purchased through MovieTixNow.com (which may or may not be one of the sources from which John previously purchased movie tickets).

The preceding discussion describes methods relating to predictive shopping notifications. Aspects of these methods may be implemented in hardware (e.g., fixed logic circuitry), firmware, software, manual processing, or any combination thereof A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable memory devices, both local and/or remote to a computer processor. The methods may also be practiced in a distributed computing mode by multiple computing devices. Further, the features described herein are platform-independent and can be implemented on a variety of computing platforms having a variety of processors.

These techniques may be embodied on one or more of the entities shown in environment 100 of FIG. 1 including as detailed in FIG. 2 or 3, and/or example device 800 described below, which may be further divided, combined, and so on. Thus, environment 100 and/or device 800 illustrate some of many possible systems or apparatuses capable of employing the described techniques. The entities of environment 100 and/or device 800 generally represent software, firmware, hardware, whole devices or networks, or a combination thereof. In the case of a software implementation, for instance, the entities (e.g., notification manager 210 or remote manager 306) represent program code that performs specified tasks when executed on a processor (e.g., processor(s)). The program code can be stored in one or more computer-readable memory devices, such as media 204, remote media 304, or computer-readable media 814 of FIG. 8.

EXAMPLE DEVICE

Figure 8:
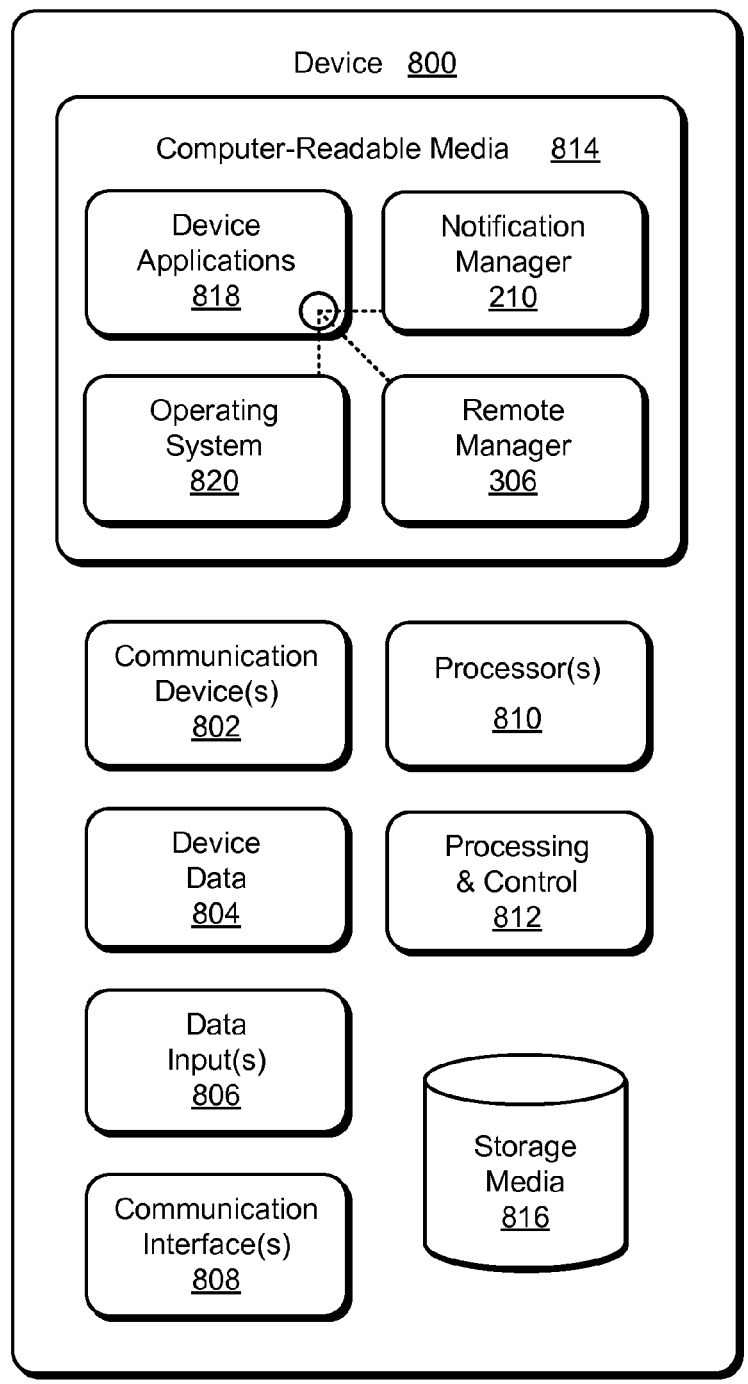
FIG. 8 illustrates an example device in which techniques for predictive shopping notifications can be implemented.

FIG. 8 illustrates various components of example device 800 that can be implemented as any type of client, server, and/or computing device as described with reference to the previous FIGS. 1-7 to implement techniques for predictive shopping notifications. In embodiments, device 800 can be implemented as one or a combination of a wired and/or wireless device, as a form of television mobile computing device (e.g., television set-top box, digital video recorder (DVR), etc.), consumer device, computer device, server device, portable computer device, user device, communication device, video processing and/or rendering device, appliance device, gaming device, electronic device, and/or as another type of device. Device 800 may also be associated with a user (e.g., a person) and/or an entity that operates the device such that a device describes logical devices that include users, software, firmware, and/or a combination of devices.

Device 800 includes communication devices 802 that enable wired and/or wireless communication of device data 804 (e.g., received data, data that is being received, data scheduled for broadcast, data packets of the data, etc.). The device data 804 or other device content can include configuration settings of the device, media content stored on the device, and/or information associated with a user of the device. Media content stored on device 800 can include any type of audio, video, and/or image data. Device 800 includes one or more data inputs 806 via which any type of data, media content, and/or inputs can be received, such as human utterances, user-selectable inputs, messages, music, television media content, recorded video content, and any other type of audio, video, and/or image data received from any content and/or data source.

Device 800 also includes communication interfaces 808, which can be implemented as any one or more of a serial and/or parallel interface, a wireless interface, any type of network interface, a modem, and as any other type of communication interface. The communication interfaces 808 provide a connection and/or communication links between device 800 and a communication network by which other electronic, computing, and communication devices communicate data with device 800.

Device 800 includes one or more processors 810 (e.g., any of microprocessors, controllers, and the like), which process various computer-executable instructions to control the operation of device 800 and to enable techniques for predictive shopping notifications. Alternatively or in addition, device 800 can be implemented with any one or combination of hardware, firmware, or fixed logic circuitry that is implemented in connection with processing and control circuits which are generally identified at 812. Although not shown, device 800 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 800 also includes computer-readable storage media 814, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 800 can also include a mass storage media device such as storage media 816.

Computer-readable storage media 814 provides data storage mechanisms to store the device data 804, as well as various device applications 818 and any other types of information and/or data related to operational aspects of device 800. For example, an operating system 820 can be maintained as a computer application with the computer-readable storage media 814 and executed on processors 810. The device applications 818 may include a device manager, such as any form of a control application, software application, signal-processing and control module, code that is native to a particular device, a hardware abstraction layer for a particular device, and so on.

The device applications 818 also include any system components, engines, or modules to implement techniques for predictive shopping notifications. In this example, the device applications 818 can include notification manager 210 or remote manager 306.

Conclusion

Although embodiments of techniques and apparatuses enabling predictive shopping notifications have been described in language specific to features and/or methods, it is to be understood that the subject of the appended claims is not necessarily limited to the specific features or methods described. Rather, the specific features and methods are disclosed as example implementations for predictive shopping notifications.

What is claimed is:

1. A method comprising:
   determining, using a processor, a purchase pattern for a product based on a purchase history of a user of a mobile device, the purchase history including at least one purchase made through the mobile device, the purchase pattern indicating a regular period at which the product is purchased;
   providing, to third parties associated with stores at which the product or another product may be purchased, the purchase pattern for the product, the other product sharing at least one type or sub-type with the product;
   receiving, from one of the third parties, a discount offer for purchasing the product or the other product; and
   providing a notification at a time determined based on the regular period and prior to a subsequent purchase of the product, through the mobile device, of the discount offer.

2. A method as described in claim 1, further comprising, prior to determining the purchase pattern, purchasing the product, through the mobile device and from a brick-and-mortar store, and wherein the purchase history includes the purchase through the mobile device and from the brick-and-mortar store.

3. A method as described in claim 2, wherein the purchase made through the mobile device and from the brick-and-mortar store is made using near-field communications (NFCs) or scanning technology.

4. A method as described in claim 1, wherein purchases included within the purchase history include online purchases from remote stores.

5. A method as described in claim 4, further comprising building the purchase history at least in part by retrieving or receiving information indicating multiple products purchased through the online purchases from a third-party purchasing entity associated with a purchasing account of the user or from shopping carts associated with the online purchases.

6. A method as described in claim 1, wherein purchases included within the purchase history include predominantly purchases made through the mobile device.

7. A method as described in claim 1, wherein the discount offer is a first discount offer and further comprising receiving, from another of the third parties, a second discount offer for purchasing the product or the other product.

8. A method as described in claim 7, further comprising determining that the first and second discount offers are for same products or same other products, determining which of the first and second discount offers offer a lowest total cost, and wherein providing the notification either provides only the first or second discount offer having the lowest total cost or provides both the first and second discount offers but indicates the lowest total cost or difference in cost between the first and second discount offers.

9. A method as described in claim 1, wherein the purchase pattern indicates the product, times at which the product was purchased, locations or stores at which the product was purchased, and prices at which the product was purchased.

10. A method as described in claim 9, wherein the discount offer is for the product at a lower cost than at least one of the prices at which the product was purchased and at a new store not indicated in the purchase history as a store at which the product was purchased, and wherein the new store is proximate to at least one of the location of the stores at which the product was purchased.

11. A method as described in claim 9, wherein the discount offer indicates an expiration and providing the notification of the discount offer provides the notification prior to the expiration.

12. A method as described in claim 1, wherein the discount offer is an electronic coupon usable through the mobile device and for the product.

13. A method as described in claim 1, wherein the discount offer is for the other product and includes information about the other product and providing the notification includes at least some of the information about the other product.

14. A method as described in claim 1, wherein the discount offer is to purchase the product at a same store as one of the stores at which the product was purchased.

15. A method as described in claim 1, further comprising determining, based on the purchase pattern for the product and information about recent purchases, that the product has not been purchased within the regular period indicated in the purchase pattern and wherein the notification indicates that the product has not recently been purchased.

16. A method comprising:
    determining, based on a purchase history of a user of a mobile device, the purchase history including purchases from multiple stores, for multiple products, and at least one of which is made through the mobile device, a purchase pattern for a product;
    determining, based on the purchase pattern for the product and information about recent purchases made through the mobile device, that the product has not been purchased within a regular period indicated in the purchase pattern, the regular period identifying a time pattern of one or more previous purchases of the product; and
    prior to a subsequent purchase of the product and at a time determined based on the regular period, providing a notification, through the mobile device, indicating that the product has not been purchased recently.

17. A method as described in claim 16, further comprising retrieving, from a third party associated with a store at which the product or another product that shares at least one type with the product may be purchased, a discount offer for purchasing the product or the other product, and wherein the notification includes the discount offer.

18. A method as described in claim 16, wherein the notification further includes a location or store at which to purchase the product.

19. A method as described in claim 16, wherein the purchases included within the purchase history predominantly include purchases made through the mobile device.

20. A method comprising:
- determining, using a processor, a purchase pattern for a product based on a purchase history of a user of a mobile device, the purchase history including at least one purchase made through the mobile device, the purchase pattern indicating a regular period of time at which the product is purchased;
- providing, to third parties associated with stores at which the product or a different product that shares a product type with the product may be purchased, the purchase pattern for the product;
- receiving, from one of the third parties, a discount offer for purchasing the product or the different product;
- determining, based on the regular period of time of the purchase pattern for the product and information about recent purchases made through the mobile device, that the product has not been purchased within one day of the regular period of time; and
- providing a notification, through the mobile device, of the discount offer and indicating that the product has not been purchased within one day of the regular period of time.

* * * * *